United States Patent Office 3,809,665
Patented May 7, 1974

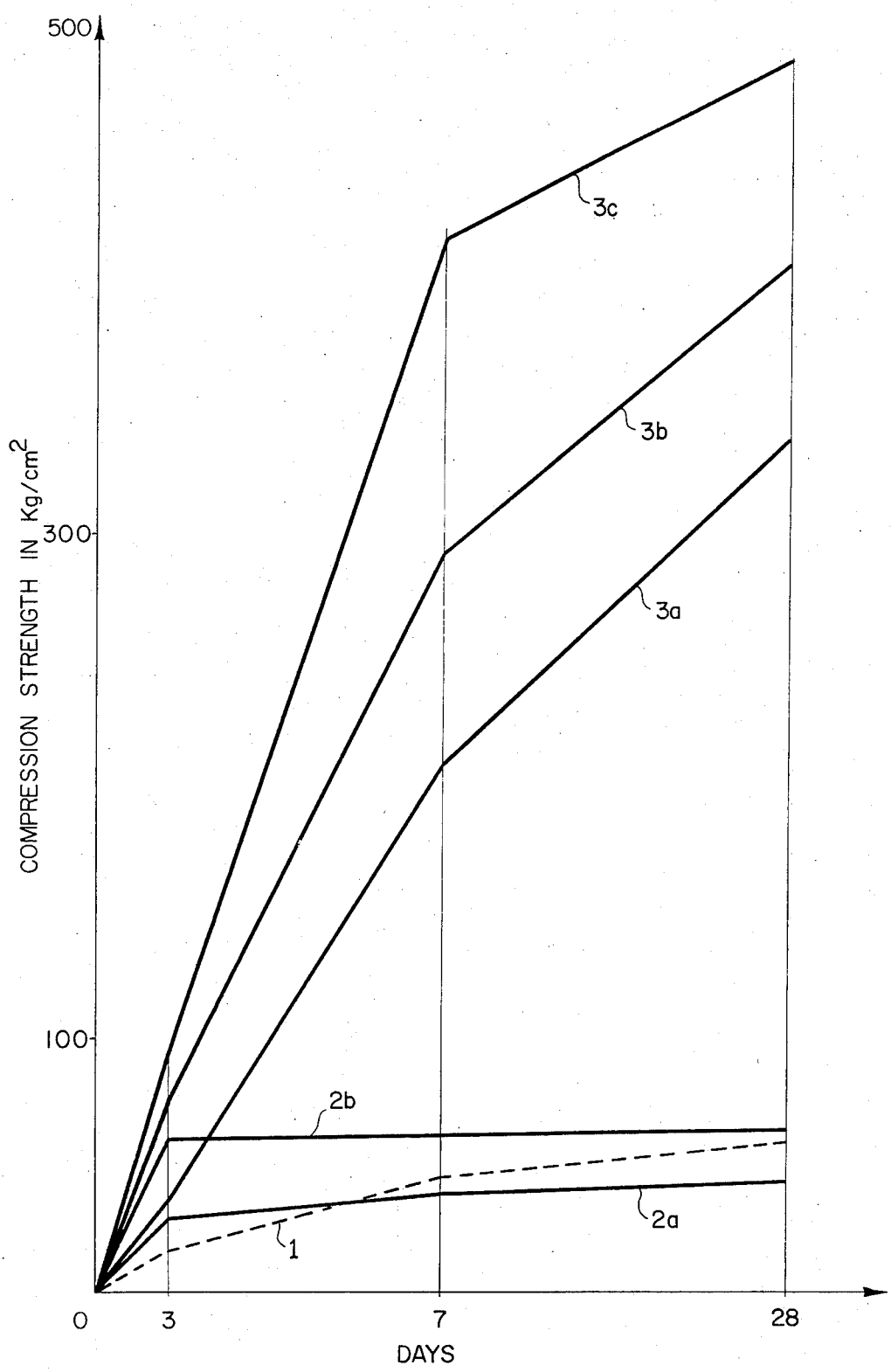

3,809,665
PRODUCT AND PROCESS FOR PREPARING IMPROVED BINDERS CONTAINING SLAG
Pierre Allemand, Lyon, and Christian Hovasse, Decines, France, assignors to Rhone-Progil, Decines, France
Filed June 14, 1972, Ser. No. 262,734
Claims priority, application France, June 14, 1971, 7122556
Int. Cl. C08f 45/04
U.S. Cl. 260—29.6 S                10 Claims

ABSTRACT OF THE DISCLOSURE

Binder compositions containing blast furnace slag and building materials, such as concretes and mortars, derived from such binders are significantly improved by the addition thereto of a mixture of metal silicate, for example, sodium or potassium silicate and an acrylic copolymer, such as acrylonitrile and acrylic acid copolymer.

BACKGROUND OF THE INVENTION

The present invention relates to hydraulic binders prepared from blast furnace slag and, more specifically, to the improvement of such binders by the addition of a mixture of alkaline metal silicates and acrylic copolymers thereto and to concretes, mortars, and the like in which these binders are incorporated.

Slag, which is a by-product formed in the production of cast iron and comprised of oxidized impurities present in metal, is generally obtained from blast furnaces in the liquid state at a temperature of about 1750° C. It is then cooled either by air, in which case a compact product results or by pouring the molten material into water. The granulated product obtained by the latter cooling method is, in fact, a supercooled liquid which retains its melting energy and which energy may be released when the granulated slag is brought into contact with water or any other wet medium. This stored energy is partly responsible for the considerable hydraulic activity characteristic of slags. However, the activity of such slags is less than that of clinkers, even after grinding granules of same and the characteristics of hydraulic binders based upon blast furnace slag or mortars and concretes in which the binders are incorporated are generally poor.

A detailed description concerning the setting process of the foregoing granulated slag is set forth in MM. Duriez and Arrambide's book entitled, "Nouveau Traité de Matéiaux de Construction," Tome I, page 382 et seq. The setting of even finely ground slag is very slow, generally about three weeks at 20° C. In an attempt to overcome this disadvantage, it has hitherto been proposed to add alkaline materials to the slag. These basic substances include alkali metal bases, such as sodium hydroxide, alkaline earth metal bases, such as calcium hydroxide, cement clinkers which liberate calcium hydroxide upon hydration, alkali or alkaline earth metal silicates and various mixtures of such bases.

The utilization of the foregoing alkaline bases, although satisfactory from a technical standpoint, is an expensive solution to the setting problem and, moreover, as a consequence of the dangers involved in the handling of such bases, one must exercise proper care when using same. Alkaline earth bases have been found to be necessary additives where it is desirable to obtain binders, concretes or mortars having an accelerated setting time as well as remaining satisfactory from an economical and mechanical standpoint.

Therefore, typical of such prior art compositions are binders derived from blast furnace slag which contain 1% to 15% by weight of alkaline earth bases with respect to slag and concrete or mortar formed from the foregoing binder and comprised of about 75 to 85 parts by weight of gravel or sand, 15 to 25 parts by weight of slag and alkaline earth bases present in the amount of 1 to 15% by weight of slag. Moreover, various additives have been incorporated into the foregoing basic formulations in efforts to improve the physical characteristics of the product. Thus, the introduction of silicates into slag containing binders, concretes, mortars and the like, has afforded products which evidence somewhat superior characteristics in comparison to those without any additives. However, the performance of these prior art products containing silicate additives remain satisfactory only for periods of up to about 3 days; thereafter they closely parallel untreated materials with respect to physical characteristics and thus are wholly inadequate for their intended use as binders or building materials containing same.

SUMMARY OF THE INVENTION

It is, therefore, a primary purpose of this invention to provide hydraulic binders, concretes, mortars and the like prepared from blast furnace slag and a process for their preparation which overcomes the problems associated with heretofore known compositions containing slag.

Another object of the present invention is to provide slag containing binders, concretes and similar industrial products and a process for the preparation of same, which products evidence improved setting characteristics and at the same time meet the performance requirements of such materials with respect to strength.

Still another object of this invention is to provide binders and the like containing blast furnace slag for use in the building industry and a process for making same whereby the application of such products in their intended field of use is facilitated as a consequence of the improved properties of the present products.

Other objects, features and advantages of this invention will become more apparent to those skilled in the art from the detailed description of the invention which follows:

BRIEF DESCRIPTION OF THE DRAWING

The sole figure depicts the comparative compression strengths plotted against time obtained with the compositions of Examples 1 through 3.

DETAILED DESCRIPTION OF THE INVENTION

In accordance with this invention, it has now been unexpectedly found that the introduction of a mixture of alkaline metal silicates and acrylic copolymers into binders based upon blast furnace slag significantly improves the mechanical performance of such binders as well as concrete, mortars and analogous building compositions containing the aforementioned binders and, moreover, facilitates the application of such materials.

Of course, mixtures of alkaline metal silicates and acrylic copolymers are known and have been utilized as binding agents in paints and varnishes to provide coatings which have hydrophobic properties as described in U.S. Pat. No. 3,450,661, filed July 22, 1965. Likewise, several examples of cements containing silicates and polymers may be found in the literature. However, the latter relate to silicate cements containing about 15% to 30% by weight of silicate as binder rather than slag and the process of silicate setting by the action of hardening agents thereon is totally different than slag setting, as previously mentioned, due to the influence of the energy factor involved when using supercooled slag.

Thus, the present invention relates to industrial products and a process for improving the physical characteristics of binders comprised of blast furnace slag and alkaline bases and to concretes and the like in which such binders are utilized which process comprises incorporating an aqueous solution of a mixture of alkaline metal silicate and acrylic copolymer, such as acrylonitrile-acrylic acid copolymer, into said binder.

In practicing the present invention, the silicate component of the mixture may be an alkaline metal silicate or poly silicate having a molar ratio of $SiO_2/M_2O$ (M=sodium or potassium) of between about 0.5 and 4, and preferably between 1.5 and 2.5.

With respect to the copolymer component, it is possible to use any product obtained by the copolymerization of acrylonitrile and acrylic acid. However, it has been found that products obtained by copolymerizing about 10 to 50 parts by weight of acrylic acid and about 90 to 50 parts by weight of acrylonitrile are preferred and yield copolymers which have excellent water solubility as well as silicate-copolymer compatibility. The respective quantities of the foregoing acrylic copolymer and alkaline metal silicate in the mixture may vary considerably. Generally, satisfactory mixtures have been obtained by mixing about 30 to 300 parts by weight of dry copolymer per 1000 parts by weight of dry silicate.

The mixture of the two components is prepared by progressively adding copolymer, for example, in the form of an aqueous solution containing 10% to 40% of copolymer, to a commercial alkaline metal silicate in solution, for example, containing 25% to 40% of the silicate, and heating the mixture to the boiling point.

On a dry basis, the mixture of alkaline metal silicate and acrylonitrile-acrylic acid copolymer is present in an amount between about 0.5% and 15% by weight of slag.

The slag utilized in the instant invention, is obtained as a by-product from iron smelting and may be derived from various iron ores, but slags of the hematite type are generally preferred. Prior to use, the slag is finely ground to obtain granules, a major proportion of which have a size less than 250 microns.

In preparing concretes, mortars, and the like according to the present invention, slag may be used alone or in combination with sand or gravel. These aggregates may be siliceous, silico-aluminous, silico-calcareous, or mixtures of the foregoing and further may be very fine (less than 0.5 millimeter) or have a spread granulometry of up to about 50 mm. The weight ratio of aggregates/slag is generally between 3 and 5.

Alkaline earth bases may also be introduced into the present composition either directly, for example, by adding calcium, barium or magnesium hydroxide, or formed in situ by adding cement clinkers which liberate calcium hydroxide when contacted with water. The compositions according to this invention may contain between about 1% and 5% by weight of the foregoing bases with respect to slag.

The total amount of water utilized in mixing the components of the instant compositions represents about 5% to 20% by weight of the slag/aggregate combination.

The compositions according to this invention are preferably prepared by mixing in a conventional mixer, slag, optionally gravel or sand and an alkaline earth base to which there is added water containing the mixture of silicate and acrylic copolymer dissolved therein. The binders, concretes or mortars derived from the foregoing compositions may then be used after thoroughly mixing the components for about one minute.

Alternatively, the compositions may be prepared by simultaneously introducing gravel or sand, slag, alkaline earth base and mixing water containing the mixture of the present invention comprised of acrylic copolymers and silicates into a mixer and stirring the preparation thus obtained for about 2 to 5 minutes prior to the use thereof.

In order to further illustrate the present invention and the advantages thereof, the following specific examples are given, it being understood that the same are intended merely as illustrative and in no wise limitative. In each of the examples hereinafter, compositions were prepared utilizing 85 parts by weight of a silico-calcareous sand 0 to 2.5 mm. in size, 15 parts by weight of a finely ground hematite type slag, and 1% by weight with respect to the total sand slag content of slaked lime. The amount of water introduced into the foregoing basic formulation was limited to 10% by weight of sand/slag content.

In order to measure compression strengths, test-tubes having a diameter of 4 cm. and a height of 1.2 meters and placed in cylindrical molds were prepared from the aforesaid compositions. These test-tubes were kept vertical for 3 days in the mold to ensure maximal moisture content and then withdrawn from the mold.

At intervals of 3 days, 7 days and 28 days, samples of the compositions having a diameter of 40 mm. and height of 80 mm. were cut into tubular forms for testing and the samples then submitted to compression strength tests. The results of these tests for the respective examples are set forth in Table 1 hereinafter and are graphically illustrated in the attached curve diagram.

EXAMPLE 1

As a control, a test-tube was prepared utilizing only the components set forth above, i.e., sand, slag and slaked lime.

EXAMPLE 2

Two tubes were prepared by introducing a quantity of sodium silicate (without any added copolymer) dispersed in water into the primary formulation. The ratio of $SiO_2/Na_2O$ in the additive was equal to 2 and the quantity of silicate added was respectively equal to 1% and 2% by weight of sand/slag content in the tubes.

In the following three examples a copolymer was prepared for use in the additive mixture of this invention as follows:

Using conventional polymerization techniques, a mixture of 80 parts by weight of acrylic acid and 100 parts by weight of acrylonitrile in 300 parts of water were polymerized by heating at 78° C. for 2 hours in the presence of 2 parts by weight of ammonium persulfate. To the resulting viscous polymer which, after heating does not contain any monomer, there was added one-half of the quantity of sodium hydroxide theoretically required to neutralize the total quantity of acrylic acid initially introduced, and the mixture then heated at 100 to 110° C. for 1 hour. Thereafter, the mixture was cooled and the pH adjusted to 7 to yield a product copolymer solution containing 20% copolymer on a dry basis.

The mixture of alkaline silicate and acrylic copolymer utilized in the following three examples was prepared as follows:

Into 75 parts by weight of a solution containing 33% of alkaline silicate, were added 10 parts by weight of the copolymer described hereinabove diluted in 15 parts by weight of water. The copolymer precipitated initially in the form of curds which subsequently slowly dissolved to form a clear solution to yield the additive mixture of the present invention. The solution thus obtained was further dissolved in water for purposes of facilitating admixture with the basic binder formulation with the total quantity of water in same equal to 10% by weight of sand/slag.

EXAMPLE 3

Three test-tubes were prepared utilizing the previously described slag formulation and the silicate-copolymer mixture described hereinabove. The alkaline silicate was a sodium silicate having a molar ratio of $SiO_2/Na_2O$ equal to 2 and the quantity of the silicate-copolymer mixture, respectively, was equal to 1%, 1.5% and 2% on a dry basis of sand/slag content.

EXAMPLE 4

Three test-tubes were prepared utilizing the sand, slag and slaked lime formulation previously described and the silicate-copolymer mixture prepared as above. The alkaline silicate in the mixture was a sodium silicate having a molar ratio of $SiO_2/Na_2O$ equal to 2.6 and the quantity of the additive mixture respectively being equal to 1%, 1.5% and 2% on a dry basis of the total sand/slag content.

EXAMPLE 5

Three test-tubes were prepared as in Example 4, except that the alkaline silicate utilized was a potassium silicate having a molar ratio of $SiO_2/K_2O$ equal to 2.

The results obtained with each of the tubes in the foregoing examples are set forth in Table 1 which follows:

TABLE 1

| | Example | | | | | | | | | | | |
|---|---|---|---|---|---|---|---|---|---|---|---|---|
| | 1 | 2 | | 3 | | | 4 | | | 5 | | |
| | Without additive | Na silicate $\frac{SiO_2}{Na_2O}=2$ | | Na silicate $\frac{SiO_2}{Na_2O}=2$ plus copolymer | | | Na silicate $\frac{SiO_2}{Na_2O}=2$ plus copolymer | | | K silicate $\frac{SiO_2}{K_2O}=2$ plus copolymer | | |
| Additive in percent | 0 | 1 | 2 | 1 | 1.5 | 2 | 1 | 1.5 | 2 | 1 | 1.5 | 2 |
| Time in days: | | | | | | | | | | | | |
| 3 | 15 | 30 | 60 | 36 | 74.5 | 94.5 | 45 | 80 | 97 | 43 | 77 | 97 |
| 7 | 45 | 40 | 62 | 211 | 295 | 418 | 185 | 205 | 350 | 85 | 130 | 154 |
| 28 | 60 | 45 | 65 | 340 | 407 | 485 | 310 | 395 | 430 | 160 | 189 | 215 |

NOTE.—Compression strengths after 3, 17 and 28 days are in kg./cm.²

It is apparent from the foregoing table that the compression strengths obtained in Examples 3, 4 and 5 utilizing the additive mixture of the present invention are far superior to those obtained in Examples 1 and 2 which did not contain the present mixture.

The excellent results obtained by adding the silicate/acrylic copolymer mixture to slag containing preparations are more clearly illustrated in the attached drawing wherein the curves represent the following:

Curve 1: Example 1—Sand-slag-calcium hydroxide
Curve 2a: Example 2—Sand-slag-calcium hydroxide +1% sodium silicate $SiO_2/Na_2O=2$
Curve 2b: Example 2—Sand-slag-calcium hydroxide +2% sodium silicate $SiO_2/Na_2O=2$
Curve 3a: Example 3—Sand-slag-calcium hydroxide +1% silicate/copolymer (sodium silicate $$SiO_2/Na_2O=2)$$

Curve 3b: Example 3—Sand-slag-calcium hydroxide +1.5% silicate/copolymer (sodium silicate $$SiO_2/Na_2O=2)$$

Curve 3c: Example 3—Sand-slag-calcium hydroxide +2% silicate/copolymer (sodium silicate $$SiO_2/Na_2O=2).$$

As indicated by the curve diagram, the addition of silicate alone (Example 2) improves the compression resistance of slag containing compositions for periods up to three days, but thereafter the strength of such compositions do not improve and, in fact, are comparable to those without any additive (Example 1). Contrariwise, the slag preparations obtained according to the instant invention employing additive mixtures of silicates and acrylic copolymers display strength characteristics which continuously improve over the measured time intervals of 3, 7 and 28 days.

There is, therefore, provided according to the present invention a process for preparing binders, concretes, mortars and the like based upon slag, which products are significantly improved by the addition of a mixture of silicate and acrylic copolymer and as a consequence thereof these slag containing products may be advantageously employed in the building or construction industry.

While the invention has been described and pointed out with reference to certain preferred embodiments thereof, those skilled in the art will appreciate that various changes and modifications and substitutions can be made without departing from the spirit of the invention. It is intended, therefore, that the invention be limited only by the scope of the claims which follow.

What is claimed is:

1. A process for preparing improved binders comprised of slag and between about 1% and 5% by weight with respect to slag of alkaline earth bases, which process comprises adding to said binders an aqueous solution of a mixture of metal silicate and a water-soluble copolymer of acrylonitrile and acrylic acid wherein said mixture is comprised of about 30 to 300 parts by weight of acrylonitrile-acrylic acid copolymer per 1000 parts by weight of silicate on a dry basis, said mixture being added in an amount equal to about 0.5% to 15% of slag on a dry weight basis, and recovering the improved product.

2. The process as defined in claim 1, wherein said metal silicate is an alkali metal silicate.

3. The process as defined by claim 2, wherein said silicate has a molar ratio of $SiO_2/M_2O$ between about 0.5 and 4, M being selected from the group consisting of sodium and potassium.

4. The process as defined by claim 3, wherein said molar ratio is between about 1.5 and 2.5.

5. The process as defined by claim 1, wherein said water-soluble copolymer is an acrylonitrile-acrylic acid copolymer obtained by polymerizing from about 10 to 50 parts by weight acrylic acid and from about 90–50 parts by weight acrylonitrile.

6. A process for preparing improved concretes and mortars which comprises incorporating therein the improved binder obtained according to the process as defined by claim 1.

7. A composition of matter comprised of slag, 1 to 5% of an alkaline earth base and 0.5% to 15% of a mixture of metal silicate and water-soluble copolymer of acrylonitrile and acrylic acid on a dry weight basis with respect to said slag, wherein said mixture is comprised of about 30 to 300 parts by weight of acrylonitrile-acrylic acid copolymer per 1000 parts by weight of silicate on a dry basis.

8. The composition as defined by claim 7, wherein said base is calcium hydroxide.

9. A building material derived from the composition as defined by claim 7 and further containing aggregates selected from the group consisting of siliceous, silico-aluminous, silico-calcareous materials and mixtures thereof.

10. The composition according to claim 7, wherein said water-soluble copolymer is an acrylonitrile-acrylic acid copolymer obtained by polymerizing from about 10 to 50 parts by weight acrylic acid and from about 90–50 parts by weight acrylonitrile.

References Cited

UNITED STATES PATENTS

| | | | |
|---|---|---|---|
| 3,450,661 | 6/1969 | Neel et al. | 260—29.6 S |
| 3,240,736 | 3/1966 | Beckwith | 260—29.6 S |

FOREIGN PATENTS

| | | | |
|---|---|---|---|
| 804,358 | 11/1958 | Great Britain | 260—29.6 S |
| 1,101,204 | 1/1968 | Great Britain | 260—29.6 S |

OTHER REFERENCES

The Condensed Chemical Dictionary, Reinhold Pub. Corp., New York, 1961, 6th ed., p. 1028.

ALLAN LIEBERMAN, Primary Examiner

J. H. DERRINGTON, Assistant Examiner

U.S. Cl. X.R.

260—41 A, 41 B